US008903428B2

(12) United States Patent
Kenington et al.

(10) Patent No.: US 8,903,428 B2
(45) Date of Patent: Dec. 2, 2014

(54) MODULAR DATA PROCESSING SYSTEM FOR MOBILE COMMUNICATIONS SYSTEM CALL DATA

(75) Inventors: Peter Kenington, Devauden (GB); Nicholas James Randell, Alton (GB); Michael Joseph Flanagan, Chester, NJ (US)

(73) Assignee: JDSU UK Limited, Basingstoke, Hampshire (GB)

( * ) Notice: Subject to any disclaimer, the term of this patent is extended or adjusted under 35 U.S.C. 154(b) by 0 days.

(21) Appl. No.: 13/293,552

(22) Filed: Nov. 10, 2011

(65) Prior Publication Data

US 2013/0122940 A1    May 16, 2013

(51) Int. Cl.
*H04W 4/00*   (2009.01)
*H04W 24/08*  (2009.01)
*H04L 29/08*  (2006.01)

(52) U.S. Cl.
CPC ........... *H04W 24/08* (2013.01); *H04L 67/1002* (2013.01)
USPC .................................... 455/456.5; 455/422.1

(58) Field of Classification Search
CPC ..... H04W 24/08; H04W 24/00; H04W 24/10; H04W 92/12; H04W 92/22; H04L 41/5009
USPC .............. 455/456.5, 456.1, 422.1, 453, 455/67.11–67.14; 370/216, 242, 328–338
See application file for complete search history.

(56) References Cited

U.S. PATENT DOCUMENTS

| | | | |
|---|---|---|---|
| 8,205,215 B2 * | 6/2012 | Khandrika et al. ........... | 719/318 |
| 2005/0003831 A1 | 1/2005 | Anderson | |
| 2006/0068712 A1 * | 3/2006 | Kroboth et al. ............ | 455/67.11 |
| 2006/0245365 A1 * | 11/2006 | Monk et al. .................... | 370/241 |
| 2009/0075648 A1 | 3/2009 | Reed et al. | |
| 2009/0075655 A1 | 3/2009 | Dobson et al. | |
| 2009/0088147 A1 | 4/2009 | Bu et al. | |
| 2011/0080826 A1 * | 4/2011 | Pereira et al. ................. | 370/225 |

FOREIGN PATENT DOCUMENTS

| | | |
|---|---|---|
| EP | 2104397 A2 | 9/2009 |
| GB | 2452796 A | 3/2009 |
| WO | 2005029892 A | 3/2005 |
| WO | 2007022540 A2 | 2/2007 |

(Continued)

OTHER PUBLICATIONS

Great Britain Search Report, Application No. GB1119396.8, filed Mar. 9, 2012. (2 pages).

(Continued)

*Primary Examiner* — Chuong A Ngo
(74) *Attorney, Agent, or Firm* — JDS Uniphase Corporation

(57) ABSTRACT

A modular data processing system (200) for processing communication session data from a cellular mobile communications system (210) comprises at least two autonomous data processing units (340). The autonomous data processing units (340) are arranged in parallel, and are operable simultaneously. Each data processing unit (340) receives and processes raw communication session data from an associated set of controllers of the cellular mobile communications system (210). At least one data collection subsystem (215) supplies the raw communication session data to the at least two autonomous data processing units (340), for calls made within the coverage area of the set of controllers associated with the data processing unit. Processed data may be available more rapidly with the invention. The invention is scalable, and the system may expand as a cellular mobile communications system grows.

25 Claims, 6 Drawing Sheets

(56) References Cited

FOREIGN PATENT DOCUMENTS

| | | | |
|---|---|---|---|
| WO | 2009034367 | A1 | 3/2009 |
| WO | 2009034391 | A1 | 3/2009 |
| WO | 2011068583 | A1 | 6/2011 |

OTHER PUBLICATIONS

PCT International Search Report and the Written Opinion of counterpart PCT Application PCT/EP2012/072304 issued by the International Searching Authority dated Mar. 20, 2013.

* cited by examiner

MODULAR DATA PROCESSING SYSTEM FOR MOBILE COMMUNICATIONS SYSTEM CALL DATA

FIELD OF THE INVENTION

The field of the invention relates to a modular data processing system and method, for call records generated in a mobile communications system.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org).

The $3^{rd}$ and $4^{th}$ generations of wireless communications, and particular systems such as LTE, have generally been developed to support macro-cell mobile phone communications. Here the 'phone' may be a smart phone, or another mobile or portable communication unit that is linked wirelessly to a network through which calls are connected. Henceforth all these devices will be referred to as mobile communication units. Calls may be data, video, or voice calls, or a combination of these. Such macro cells utilise high power base stations to communicate with wireless communication units within a relatively large geographical coverage area. The coverage area may be several square kilometers, or larger if it is not in a built-up area.

Typically, mobile communication units communicate with each other and other telephone systems through a network. In a 3G system, this is the 'Core Network' of the 3G wireless communication system, and the communication is via a Radio Network Subsystem. A wireless communication system typically comprises a plurality of Radio Network Subsystems. Each Radio Network Subsystem comprises one or more cells, to which mobile communication units (UEs) may attach, and thereby connect to the network. A base station may serve a cell with multiple antennas, each of which serves one sector of the cell.

Overview of Prior Art Approaches

Every time a mobile communication unit makes a call via a network, several messages are sent inside the mobile network. These messages allow the call to take place. In prior art approaches, these messages have generally been discarded. The decision to discard these messages results from the massive rate of generation of these messages. The resulting volume of messages has been considered too great to store. If these messages are collected, then they tend to be collected for a short period of time. This is generally less than one day. The messages are then processed offline. The processing is typically carried out in order to look for a specific problem in a network, such as one reported by a user.

In the prior art, it is known to extract network data from a radio network controller (RNC) or similar network element. This data may be processed to provide geographic location information, for the users and their associated quality of service information. This is typically achieved either by:
(i) 'Probing' a suitable data flow, for example between the RNC and another network element. That network element may be the operational support system, or 'OSS'.
(ii) Extracting data directly from the operational support system, or other suitable component connected directly to the radio network controller.

Given that the probed data or extracted data is provided by a single item of equipment, it is then possible to route the information directly to a suitably large processing unit. The processing unit can process the data, and sort the data to find the data that the network operations staff typically need to display. Geolocation information may also be derived, to derive the user's location associated with each individual file of data.

However, this known prior art has disadvantages. It is difficult to process the data efficiently, due to the volume of data involved. This approach is also problematic with cellular mobile communications that have to be enlarged. It is in particular expensive to size the data processing unit appropriately, for a network whose future size is unknown. There is no practical way for this type of architecture to grow 'organically' as the network expands.

Looking at the processing of data in such a system, several types of information might be of value to the operations staff of the cellular mobile communications network. These include 'Quality of Service' (QoS) information and 'Geolocation' information:

a) Quality of Service information reveals how well the network is supporting users of the network. A high quality of service may be indicated by a very low rate of 'dropped' calls, or by very few mobiles experiencing low or highly variable signal strength. In most known cellular networks, quality of service information is reported on a 'per-cell' or 'per-sector basis'. This means that the network statistics obtained will only provide an indication of, for example, the average data rate or the average number of dropped calls in a given sector.

b) Geo-location is the identification of the real-world geographical location of a mobile communication unit. Geolocation of mobile communication units can be performed in several ways. These include providing a mobile communication unit with positioning equipment, such as GPS, or using network and mobile measurement data from nearby cells.

The network statistics referred to above, which only provide the average data rate or the average number of dropped calls in a given sector, are insufficient for some tasks faced by network operators. Some network operators have therefore tried to improve the information available on service levels and/or available for deriving geolocation information.

One attempt to do this has involved compiling more comprehensive data, for a limited time, on what exactly is happening in one sector or one cell of a network. The operator initially makes a decision which cell to monitor, and for how long. The cell may be chosen, for example, because it is the cell in which a user who has made a complaint lives. The duration of the monitoring may depend on the amount of storage that the operator considers justified for the investigation. There are two reasons why this is only done rarely, as follows:

(i) A vast amount of data is created, even for a short time period such as a few hours. Storing this data in a retrievable form is very expensive.

(ii) If data concerning calls made in a sector or cell of a network is captured for a period of a few hours, it then requires specialist post-processing. Any information that can be derived from the data about a user or part of the network is then often only available several hours after the end of the data capture. This may be several days after a user has made a complaint. Such information is often only of limited value.

Prior art approaches (i) and (ii) above amount to a 'batch processing' technique. This approach gathers all of the information for a time period after a problem arose in a network sector. The data is essentially obtained manually, by the operator of the network. After capture of the data, it is then 'fed' to the processing system, which will then process the information off-line. This typically results in a delay of many hours, between the event of interest taking place and the resulting diagnostic information being available.

The fact that the process is 'retroactive' may also be a problem. The approach will only assist in identifying a fault:
(i) If it is a network fault that is still detectable, rather than one that only occurs intermittently. An intermittent fault could have many causes, such as one that occurs at particular times of day, or under certain external circumstances such as ambient temperature or vibrations of an antenna due to a particular wind direction.
(ii) If the user happens to be active during the few hours when the data is captured, for faults that are entirely due to the user's handset.

FIG. 1 provides a more detailed view of one prior art approach. The system of FIG. 1 seeks to extract data concerning activity in one part of a cellular mobile communications system, for a period of a few hours. The data may be obtained from a radio network controller (RNC) 112 or similar network element. Server 120 may then process this data. The processing may be specifically to find data about a particular user, who has reported a fault. More general information may be obtained, for example, the quality of service information for a group of users.

The amounts of data obtained even by the system of FIG. 1 are extremely large. The data may be sent to a database server 130 and on to a storage system 140. All prior art systems known to the inventors that attempt to record all data about what is happening in a sector or cell, place this data, in its entirety, either:
(i) On a single storage device, such as storage system 140 shown in FIG. 1; or
(ii) On a series of linked storage devices, connected to a database server such as server 130 shown on FIG. 1.

However, the prior art system may even aim to store all data for a series of RNCs 112, 114, 116. This volume of data would typically require several storage devices, each linked to database server 130.

A user of the system of FIG. 1 may seek to examine some part of the large volume of data on storage system 140. The user is shown as reference 150. User 150 may access the storage system 140 via an application server 160. The system of FIG. 1 may also include information about the configuration of the network containing RNCs 112, 114 and 116. This information may have been obtained from outside the system shown on FIG. 1.

The user faces several problems, such as the data being available on storage system 140 many hours after a fault may have occurred, and the difficulty in finding individual pieces of information.

It might be assumed that it is possible to sort the acquired data and 'throw away' the information which is not required for display and reporting purposes. However, this has proved unacceptable in prior art systems, because the personnel in the network operations centre have a requirement to be able to diagnose problems with particular calls, or particular user devices. It may also be necessary to diagnose a systemic fault with a particular brand or model of phone, or other user terminal device.

If we assume that an attempt is made using the system of FIG. 1 to store all data, from all RNCs 112, 114 and 116 of a mobile communications system, then the storage and retrieval system shown in FIG. 1 has very significant disadvantages. When seeking information about, for example, an individual handset or user, the whole of the data in storage device 140 must be searched and processed. This is necessary, in order just to extract the relatively small amounts of data which the network operations centre in a radio network needs, for example, to make day-to-day judgements upon the quality of service offered by the network, to its users.

The 'raw' information which must be searched amounts to some ten times the amount of data which is typically required for display to the network operations managers. The processing of this unnecessarily large amount of data makes the reporting process very slow. In a typical prior art approach, the reporting process can take many hours. As a consequence, the information is therefore available to the network management centre some significant time after the user's phone-calls or data sessions to which that quality-of-service data refers.

Prior art systems have typically involved solutions that involve very large data stores, which are expensive. These systems often only provide useful information many hours after events in a network have occurred.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

Examples of the invention will be described in terms of a modular data processing system and a method for processing communication session data from a cellular mobile communications system.

The inventive concept herein described may be implemented within cellular communication networks adapted in accordance with various alternative wireless communication technologies and standards. The term 'cellular mobile communications system' will be used for all such systems. Furthermore, the inventive concept may be implemented in a wide variety of signal processing circuits. It is further envisaged that, for example, a semiconductor manufacturer may employ the inventive concept in a design of a stand-alone device, such as a microcontroller, digital signal processor, or application-specific integrated circuit (ASIC) and/or any other sub-system element.

The invention seeks to mitigate, alleviate or eliminate one or more of the disadvantages of conventional approaches, singly or in any combination. The invention proposes the use of multiple, parallel, autonomous, data processing units. These may be housed in 'data loaders', which provide additional functionality.

Each data processing unit deals with the data from a set of RNCs of the cellular mobile communications system. Data is extracted, in parallel, from each set of RNCs, and supplied to one of the parallel data processing units. In this way, a huge amount of data can be processed simultaneously. The overall output of the parallel processors is a set of data that has previously been difficult or impossible to obtain. The processed data is available significantly more quickly than with prior art approaches. In a typical configuration, this architecture can process and display, in a few minutes, what it takes prior art systems many hours to process and display.

Figure 1:
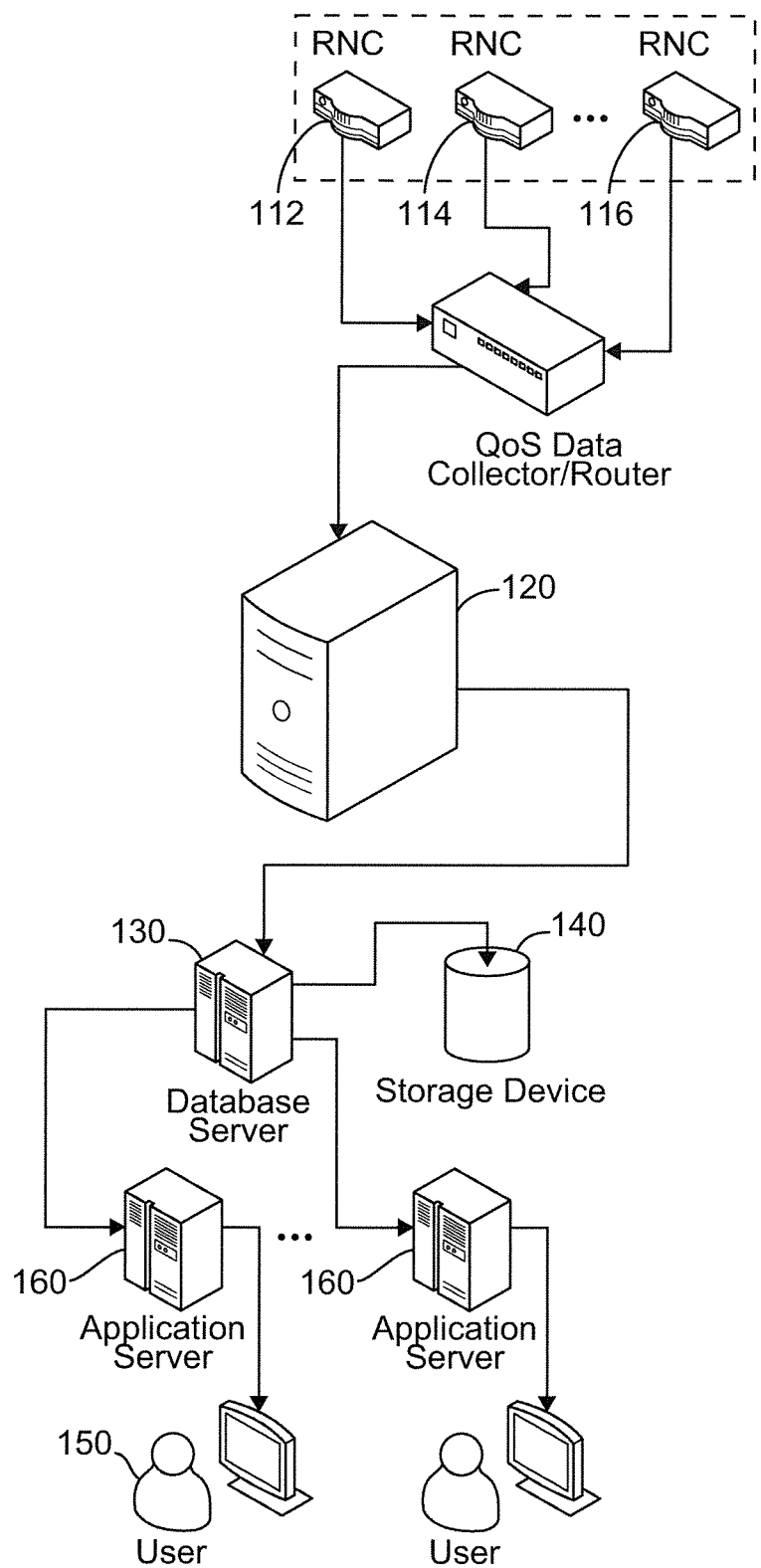
FIG. 1 is a schematic diagram, illustrating a prior art system.

A further advantage of the present invention may be the ease with which the system of the invention can be expanded. More autonomous data processing units can be added in parallel, incrementally, as more base-stations and controllers are added to the network of the cellular mobile communications system. In prior art systems, typical approaches to network expansion involve simply using the existing hardware such as that in FIG. 1 to retrieve and process a smaller proportion of communication session data, from the expanded cellular mobile communications system.

Figure 2:
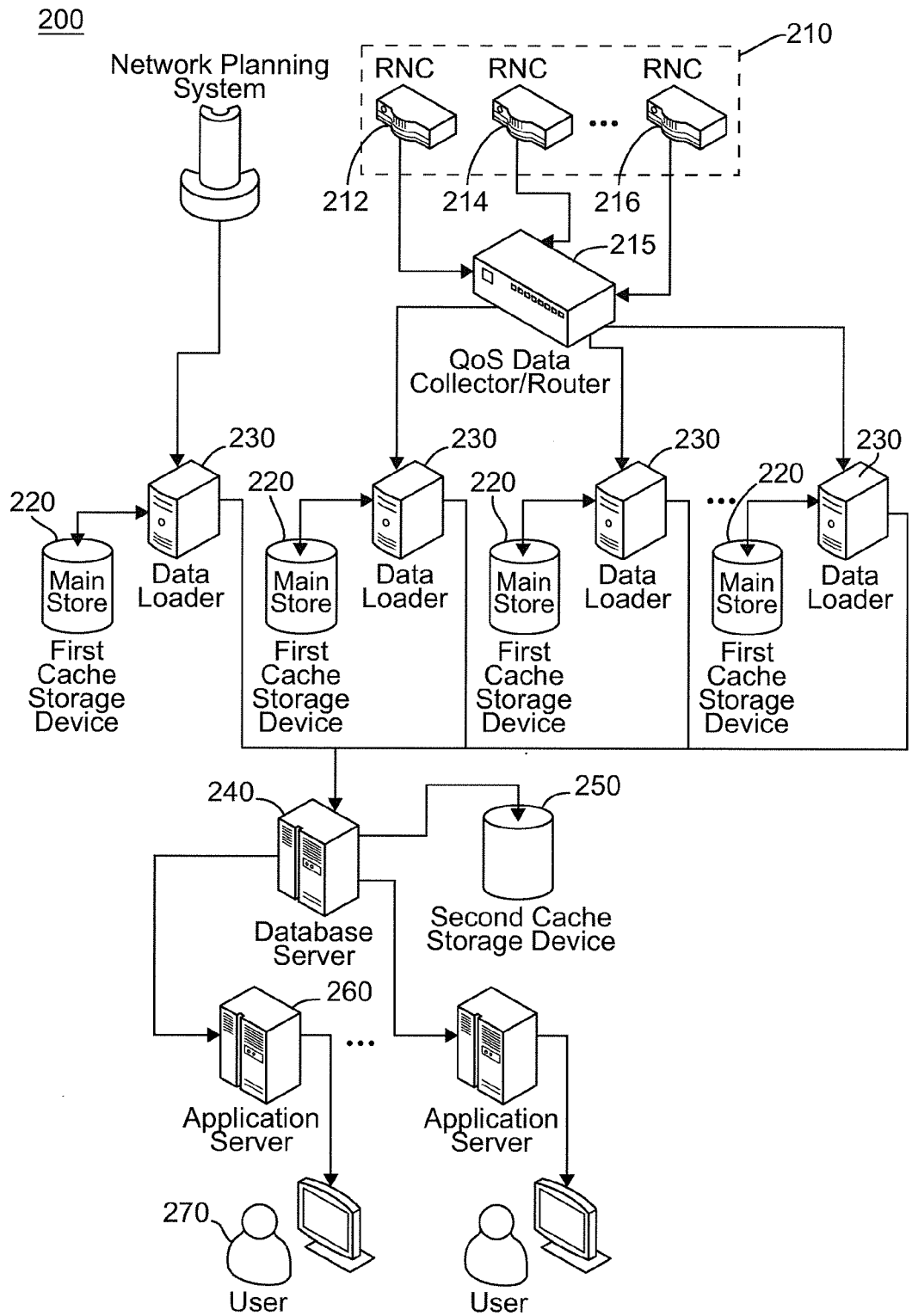
FIG. 2 is a schematic diagram, illustrating a system in accordance with the invention.

FIG. 2 is a schematic diagram, illustrating a modular data processing system 200, in accordance with the invention, for processing communication session data from a cellular mobile communications system 210. FIG. 2 should be read in conjunction with FIG. 3.

Figure 3:
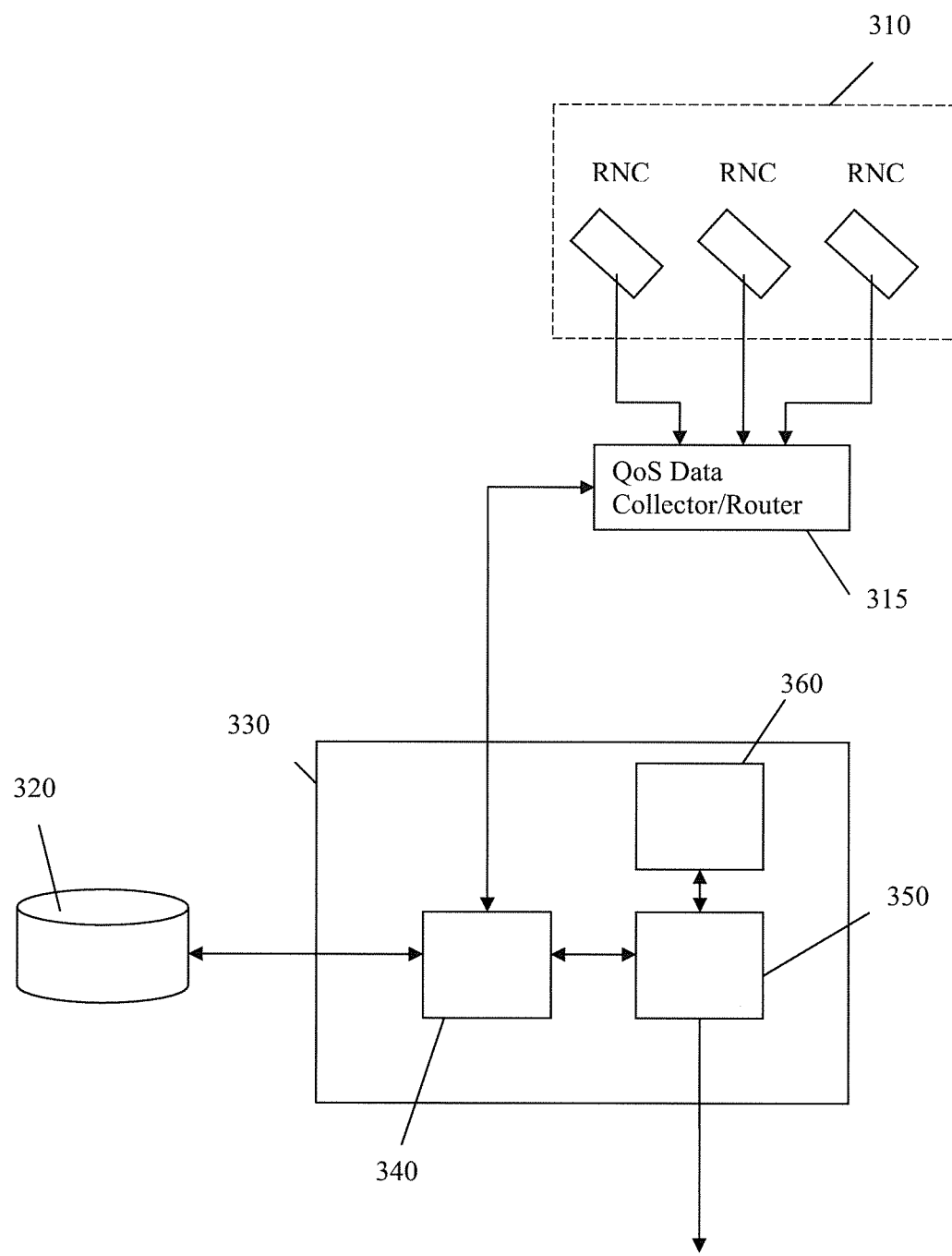
FIG. 3 is a block diagram, illustrating a detail of the system of FIG. 2.

FIG. 3 shows details of the modular data processing system 200. Notably, in FIG. 3, the internal arrangement of a data loader 330 is shown. Data loader 330 corresponds to data loader 230 of FIG. 2. Processing module 340 resides within data loader 330.

Modular data processing system 200 comprises autonomous data processing units, shown with reference 340 in FIG. 3. Each data processing unit 340 may form part of a data loader 230 of FIG. 2. Although the invention may be implemented with only two data processing units 340, it may instead, or after expansion, comprise more than two autonomous data processing units 340. In the embodiment of FIG. 2, each of the four data loaders 230 houses one data processing unit 340.

The data processing units 340 are arranged in parallel. Data processing units 340 can operate simultaneously, to receive and process raw communication session data from an associated set of the controllers 212, 214, 216 of the cellular mobile communications system 210.

The set of controllers associated with a particular data processing unit 340 may comprise between two and twenty radio network controllers of a 3G network, for example. Typically, there might be ten radio network controllers in one set. In other types of mobile communication system, the controllers 212, 214, 216 may be other types of circuit elements within the mobile communication system that handle call information from base stations, or their equivalent.

A particular data processing unit 340 receives data from an associated set of controllers that may not be fixed in time. At least one controller may be added to, or removed from, the set of controllers after a first time interval. The first time interval may be between 5 and 60 minutes. Data processing unit 340 may receive and process data from its associated set of controllers for a first time period of, for example, 15 minutes. Normally, the set of controllers would remain fixed for at least this time. However, before the start of the next 15 minute interval, the members of the set of controllers associated with a given data processing unit 340 may be varied.

The modular data processing system 200 thus includes at least two data processing units 340, each operable to process the raw communication session data for calls made within the coverage area of its associated set of controllers. This processing occurs in parallel to the processing in the other data processing units 340, but independently of the other data processing units.

The data processing units 340 may be linked to a common memory 250, shown in FIG. 2. Common memory 250 may receive processed data from all the associated sets of controllers of the mobile communication system. The processed data in common memory 250 may be accessible to external users. These users are shown as users 270. Application servers 260 may facilitate access to the processed data in common memory 250, via a database server 240.

The modular data processing system 200 further comprises at least one data collection subsystem 215. Data collection subsystem 215 may take the form of a data collector or router, as shown in FIG. 2. Data collection subsystem 215 is associated with the data processing units 340. There may be one data collection subsystem 215, serving at least two data processing units 340.

The at least one data collection subsystem 215 supplies the raw communication session data to the autonomous data processing units 340. The data supplied to each data processing unit 340 relates to calls made within the coverage area of the set of controllers associated with that data processing unit. Thus data collection subsystem 215 serves to gather data from each set of controllers, and distribute it to the correct data processing unit 340 for processing.

One data collection subsystem 215 may supply raw communication session data to all the data processing units 340. This single data collection subsystem 215 may be the operational support system of the cellular mobile communications system 210. The raw communications data supplied by the operational support system to each data processing unit is for calls made within the coverage area of the set of radio network controllers associated with that data processing unit.

The at least one data collection subsystem 215 may supply, to each data processing unit 340, substantially all of the communication session data reaching the operational support system of the cellular mobile communications system 210. Here 'all' the data would mean that all data, relating to all calls in the coverage area of the set of controllers associated with the data processing unit 340, would be supplied.

As shown in FIG. 3, control unit 350 also resides within data loader 330. Control unit 350 may act as a synchronisation module in some embodiments of the invention, and this is explained in more detail below.

Data loader 330 also comprises a temporary local storage area 360. Data loader 330 is connected to:
(i) An associated external storage area 320, which corresponds to the external storage area 220 shown in FIG. 2;
(ii) Data collector/router 315, which corresponds to data collector/router 215 of FIG. 2. Data collector/router 315 acts as a data collection subsystem. Data collector/router 315 is connected to the Radio Network Controllers (RNCs), which form part of mobile communication system 310. Only three RNCs are shown, but there may be many more.

The dataloaders 230, 330 of the system may synchronise the download of data from the data processing units 340 to the common memory 250. Each dataloader's controller may act as a synchronisation module, which arranges for the synchronisation. In embodiments of the invention in which synchronisation of data download to memory 250 is not used, the controller 250 may simply forward the data from data processing unit 340 to common memory 250, as soon as the data has been processed in data processing unit 340.

When synchronisation is used, the controller 350 of each data loader 330 may only download processed data for calls made during a second predetermined time interval, to the common memory 250, when processed data for the second predetermined time interval is available from all of the data processing units 340.

The second predetermined time interval may cover the time period from a first time point to a second time point. These time points may cover, for example, a fifteen minute interval. The fifteen minute interval may relate to a time period for which data processor 340 is able to process typical volumes of call data. So the controllers 350 may ensure that data is downloaded to the common memory 250, only when all of the data processing units 340 are ready to provide processed data for the same fifteen minute interval. This arrangement results in data for all calls made in all the associated sets of controllers, in exactly the same fifteen minute interval, reaching the common memory 250 at the same time. One advantage of this may be to minimise the total amount of temporary memory within the whole modular data processing system 200.

A local data store 360 may be provided within data loader 330. Local data store 360 may temporarily store the raw communication session data, during processing by the data processing unit 340, and prior to download to the common memory 250.

The modular data processing system 200 illustrated in FIGS. 2 and 3 may provide several advantages, over prior art arrangements. The modular system provides parallel operation, of autonomous data processors. This approach breaks down the high volume of data that originates in a modern cellular mobile communications system. The data processors can deliver information to a common memory 250, in significantly less time than would have been the case if the architecture of FIG. 1 had been used.

This 'multi-loader' architecture of FIGS. 2 and 3 is very simple to expand, as the cellular mobile communications system expands, and hence the number of RNCs increases. Additional data processing units 340 and data loaders 230, 330 can be added at a rate of one loader per n RNCs. Here n may be a fixed integer for a given loader's processing capability. However, if all data loaders in the system are not identical, then data processing units that are added to the system may be supplied with data from more than n RNCs, or fewer than n RNCs. The system is therefore adaptable, for future developments in processing power, and possibly in RNC sizes.

Each data processing unit 340 operates entirely independently of the other data processing units. Each data processing unit 340 may supply information to the common memory 250 as and when it has completed the required processing of that data. In that case, the dispatch of processed data from each data processing unit 340 does not have to wait for any of the other data processing units to finish or be ready. However, data synchronisation between the data processing units 340 can be implemented, and yet the processing of the data in each data processing unit can still occur independently of the other data processing units 340. This approach reduces the load on common memory 250.

In addition, it is possible to split common memory 250 into different physical memories, which are seen as one destination by all the data processing units 340. Synchronisation might also be implemented in order to assist the calculation of time differences, in different data processing units 340, for base stations of the mobile cellular communications network that may be 'seen' by more than one radio network controller at a time.

The modular data processing system of the invention may provide information to users in a network operations centre between a few minutes and around one hour (maximum), from the time the relevant call was placed. With typical mobile cellular communication networks, fifteen minutes of delay is inherent in the reporting mechanism of the RNC, in the worst-case scenario. This fifteen minute delay is a significant part of the one hour maximum time quoted above. So the present invention may add only a few minutes to the delay inherent in the receipt of data from the mobile cellular communication network. Prior art systems, typically, take many hours to provide their processed data.

A further advantage of the modular approach of the invention is that it may provide significantly faster recovery in the event of failure. The local data store 360 and/or external storage 320 may assist in restarting the system, following a system failure, with minimal loss of data. However, neither local data store 360 nor external storage 320 is essential to the invention. Local data store 360 may be a cache, and external storage 320 may be a remote store, which may be shared. However, these memories may themselves be fragile, and the local data store 360 may itself be wiped in some types of system restart. The external storage 320, if remote, introduces another two possible points of failure: the remote system and the remote link. A shared remote store may also become busy, and this will slow it down.

A further advantage of the modular approach of the invention is that it may make it significantly easier to move processing from one system to another. The system does not need to be configured for individual RNCs, but will process all of the RNCs available. So RNCs can be replaced, maintained or divided, and the invention is still able to handle the data from the RNCs.

Figure 4:
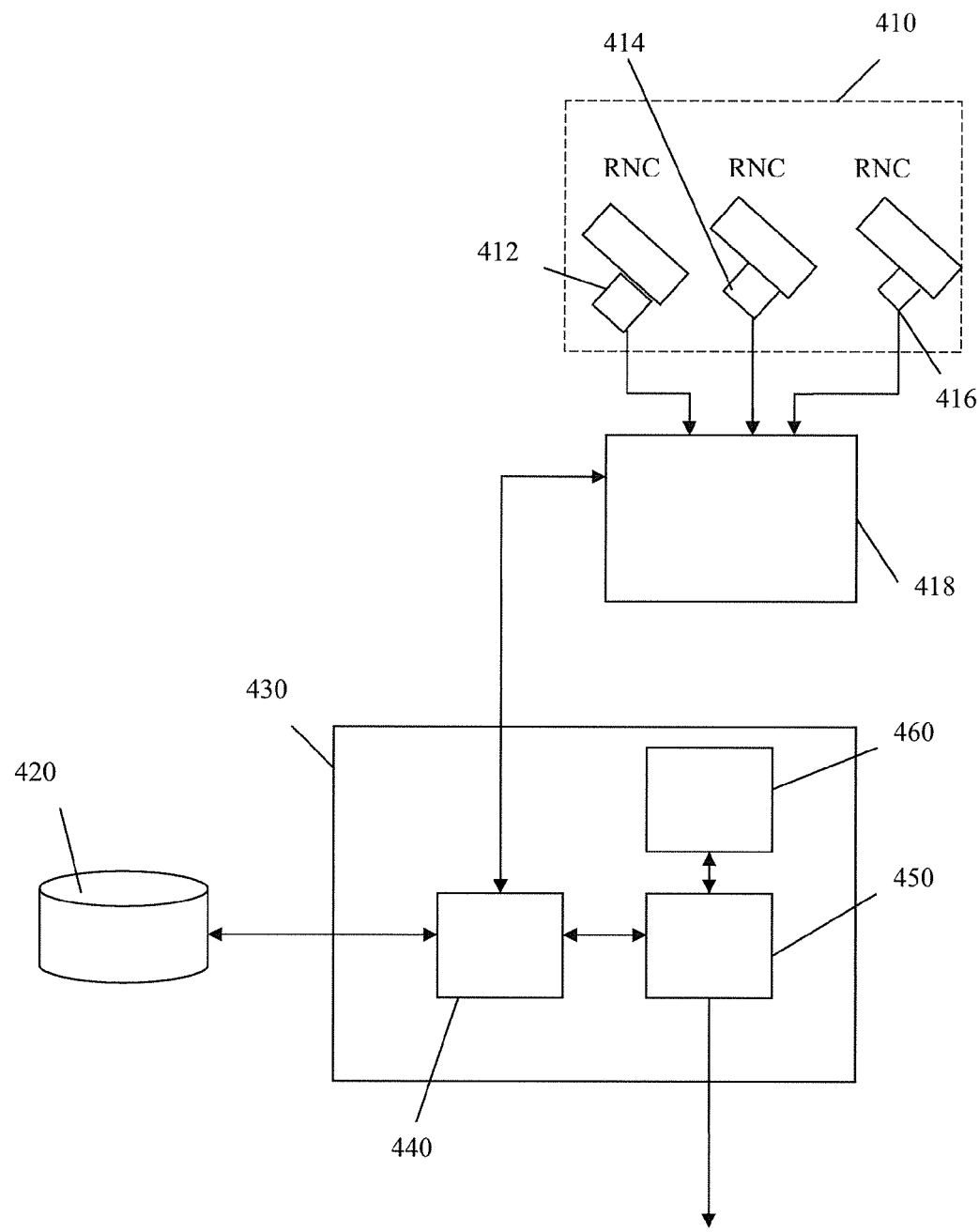
FIG. 4 is a block diagram, illustrating a detail of an alternative embodiment of the invention.

FIG. 4 shows an alternative approach to gathering call data from the radio network controllers. Dataloader 430, processing module 440, synchronisation module 450, local data store 460 and associated external storage area 420 correspond to the similarly numbered elements in FIG. 3.

In FIG. 4, network probes 412, 414 and 416 each gather data from a radio network controller of the cellular mobile communications system 210. There may be many more network probes, each associated with one radio network controller. Data collector 418 of FIG. 4 may have less functionality than the data collection subsystem 215 of FIG. 2. However, data collector 418 supplies the raw communication session data to the correct data processing units 440. This is the data collected by the network probe 412, 414, 416, for calls made within the coverage area of the set of controllers associated with the data processing unit 440.

In the embodiment of FIG. 4, therefore, each data collection subsystem can be considered to comprise the set of network probes 412, 414, 416. Each network probe supplies raw communications data for calls made within the coverage area of one of the radio network controllers, associated with the data processing unit(s) to which data collector 418 is connected.

The embodiment shown in FIG. 4 has each probe 412, 414, 416 shown attached to an RNC. However, each network probe 412, 414, 416 may in practice be connected between the radio network controller and another element of the mobile radio communications network. The network probe then captures communication session data flowing between the radio network controller and the other element. The 'other element' may be the operational support system of the mobile radio communications network.

Figure 5:
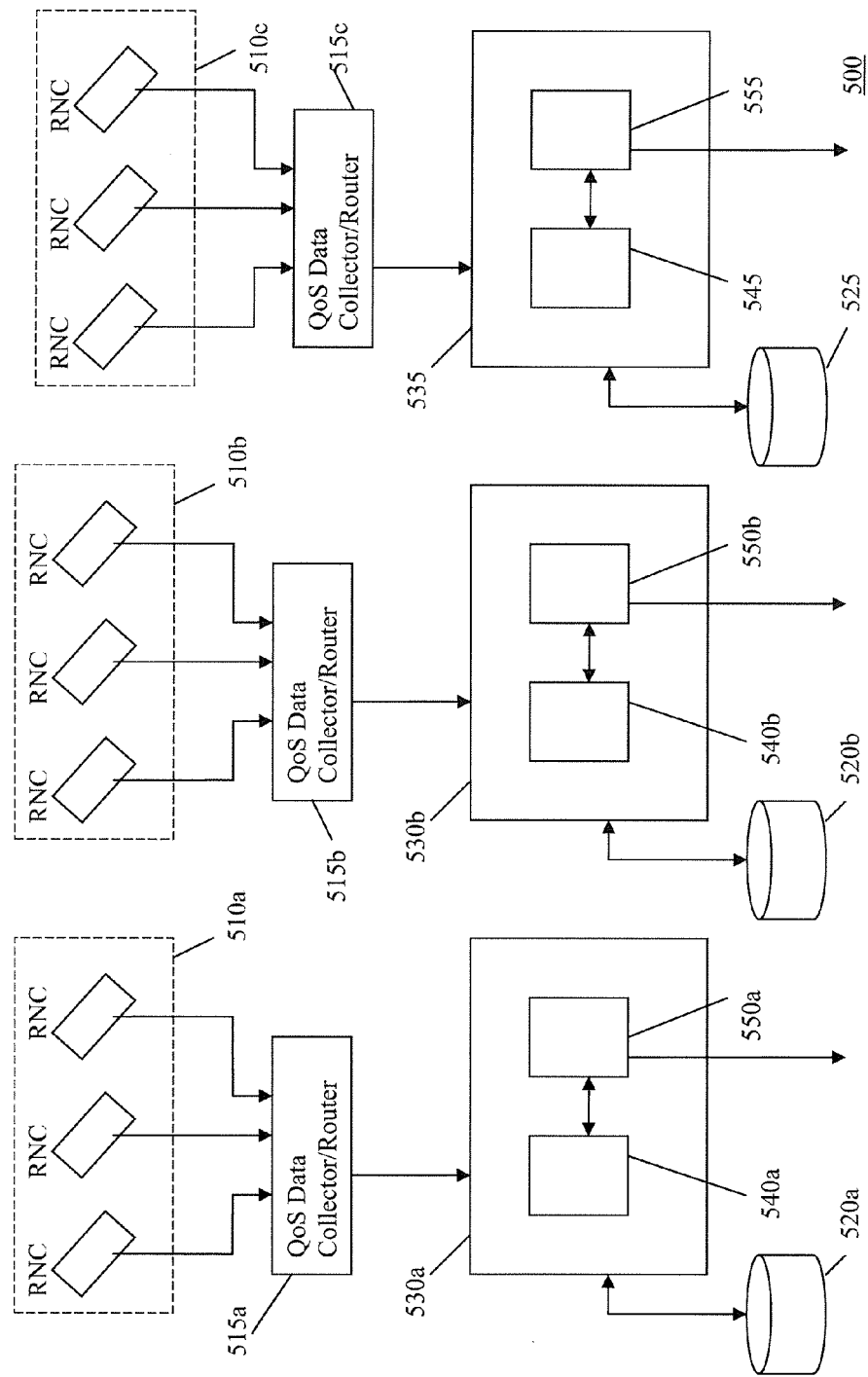
FIG. 5 is a block diagram, illustrating the modular nature of the invention.

FIG. 5 shows clearly that the modular data system of the invention may be expandable, for example after initial deployment.

FIG. 5 shows modular data system 500. The system comprises two modules, at the left and centre of the figure. One module has suffix 'a' for its components, and the other has suffix 'b'. Dataloader 530, processing module 540, controller 550, and associated external storage area 520 correspond to the similarly numbered elements in FIG. 3. Cellular mobile communications system 310 has been divided up into sections 510a, 510b. Each of these section supplies a data collector/router 515a, 515b. These components of FIG. 5 may, for example, describe a modular data processing system in accordance with the invention, as it is initially installed.

However, the modular data processing system 500 may be expanded by the addition of a further data processing unit 545, in parallel to the two data processing units 540a and 540b. Further data processing unit 545 is located within data loader 535 of FIG. 5.

The further data processing unit 545 has an associated set of controllers RNC of the cellular mobile communications system 510c. Further data processing unit 545 is also linked to the common memory area 250. In FIG. 5, this link is shown as passing through controller/synchronisation module 555. However, in an embodiment where synchronisation is not employed, then controller 555 may simply forward processed data from further data processing unit 545 to the common memory area 250, when it is available.

Data loader 535 may comprise a local data store for temporarily storing the raw communication session data, during processing by the data processing unit. The local data stores are not shown in FIG. 5 in order not to over complicate the figure, but are analogous to local data stores 360 of FIG. 3 and 460 of FIG. 4.

Each of data processing units 340, 440, 540a, 540b and 545 may provide processed data of various kinds. It is not essential that every processing module provide the same kind of data at all times, but this may be a common configuration. The processed data from a particular data processing unit may encompass:
(i) Geolocation and/or quality of service data, for all calls occurring in the coverage area of the set of radio network controllers associated with the data processing unit.
(ii) Data that can feed into the production of one or more of a coverage map, raw statistics, or network-wide statistics.

Figure 6:
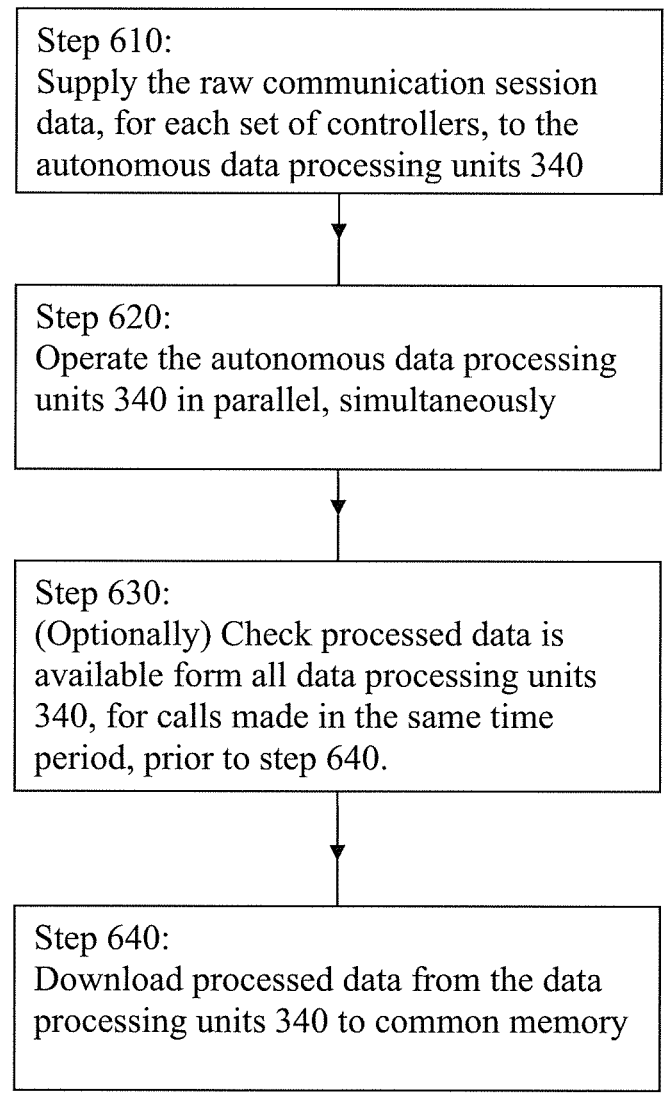
FIG. 6 is a simplified flowchart of a method in accordance with the invention.

Although the discussion of FIGS. 2-5 has focussed on structural features of embodiments of the invention, this discussion also encompassed a method in accordance with the invention. FIG. 6 shows a simplified flowchart of a method in accordance with the invention.

Step 610 shows the supply of the raw communication session data, to at least two autonomous data processing units 340. The raw communication session data supplied to each of the at least two autonomous data processing units 340 relates to calls made within a coverage area of a set of controllers associated with the data processing unit.

Step 620 shows the operation of the at least two autonomous data processing units 340 in parallel, and simultaneously. Each data processing unit 340 receives and processes the raw communication session data from the set of controllers of the cellular mobile communications system 210 associated with the data processing unit 340 concerned.

Step 630 shows an optional synchronisation step. The processed data from all data processing units may only be forwarded to the common memory 250, when all data processing units have finished processing data for the same time period of calls. This is the second predetermined time period. All the processed data must then be available, from all the data processing units, before step 640 commences. Step 640 shows the download of data from the at least two data processing units 340, 440, 540 and 545 to the common memory.

A computer-readable storage device may be provided, the storage device having stored executable program code for programming signal processing logic to perform the method of the invention. The computer-readable storage device may comprise at least one of: a hard disk, a CD-ROM, an optical storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

It will be appreciated that, for clarity purposes, the above description has described embodiments of the invention with reference to different functional units and processors. However, it will be apparent that any suitable distribution of functionality between different functional units or processors, for example with respect to the beamforming module or beam scanning module, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as field programmable gate array (FPGA) devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved modular data processing system, for processing communication session data from a cellular mobile communications system has been provided. Also provided are: a corresponding method; and a computer-readable storage device having executable program code stored therein for programming signal processing logic to perform the method of the invention. The aforementioned disadvantages with prior art arrangements have been substantially alleviated.

What is claimed is:

1. A modular data processing system for processing communication session data from a cellular mobile communications system, the modular data processing system comprising:
- a plurality of controllers grouped into a plurality of sets with each one of the plurality of sets having at least two controllers;
- at least one data collection subsystem associated with the plurality of controllers;
- a plurality of autonomous data processing units arranged in parallel and operable simultaneously, each data processing unit operable to receive and process raw communication session data from one set of controllers associated with a data processing unit, each set of controllers having a coverage area of the cellular mobile communications system;
- at least one common memory device for storing processed communication session data from the plurality of data processing units for subsequent access by at least one user; and
- wherein the at least one data collection subsystem is operable to gather raw communication session data from each of the plurality of sets of controllers and to distribute the received raw communication session data to the at least two autonomous data processing units for calls made within the coverage area of the set of controllers associated with the data processing unit.

2. A modular data processing system in accordance with claim 1, wherein each of the plurality data processing units is:
- (i) operable to process the raw communication session data for calls made within the coverage area of the associated set of controllers, independently of other data processing units; and
- (ii) linked to the common memory for receiving processed data from all the associated sets of controllers, the processed data in the common memory being accessible to external users.

3. A modular data processing system in accordance with claim 1, wherein:
- a set of controllers of the cellular mobile communications system associated with at least one of the data processing units comprises between two and twenty radio network controllers; and
- at least one member is added to or removed from the set of controllers after a first predetermined time interval.

4. A modular data processing system in accordance with claim 3, wherein:
- the first predetermined time interval is between 5 and 60 minutes.

5. A modular data processing system in accordance with claim 1, further comprising:
- each data processing unit forming part of a dataloader;
- the dataloaders being operable to synchronize the download of data from the at least two data processing units to the common memory.

6. A modular data processing system in accordance with claim 5, further comprising:
- a second predetermined time interval, covering the time period from a first time point to a second time point;
- each dataloader comprising a synchronization module, the synchronization module being operable to download processed data for calls made during the second predetermined time interval, to the common memory, only when processed data for the second predetermined time interval is available from all of the at least two data processing units.

7. A modular data processing system in accordance with claim 1, further comprising:
- the modular data system being expandable, after deployment, by the addition of a further autonomous data processing unit in parallel to the at least two data processing units, the further autonomous data processing unit:
  - (i) having an associated set of controllers of the cellular mobile communications system; and
  - (ii) being linked to the common memory area.

8. A modular data processing system in accordance with claim 1, wherein:
- each data processing unit is associated with a local data store for temporarily storing the raw communication session data, during processing by the data processing unit.

9. A modular data processing system in accordance with claim 1, wherein:
- (i) the controllers are radio network controllers of the cellular mobile communications system;
- (ii) one data collection subsystem is operable to supply raw communication session data to all the at least two data processing units, the data collection subsystem supplying raw communications data to each data processing unit for calls made within the coverage area of the set of radio network controllers associated with the data processing unit;
- (iii) the data collection subsystem is the operational support system of the cellular mobile communications system.

10. A modular data processing system in accordance with claim 1, wherein:
- the raw communications data supplied to each data processing unit is substantially all the communication session data reaching the operational support system, relating to calls in the coverage area of the set of controllers associated with the data processing unit.

11. A modular data processing system in accordance with claim 1, wherein:
- (i) the controllers are radio network controllers of the cellular mobile communications system;
- (ii) one data collection subsystem is provided for each data processing unit, each data collection subsystem comprising a set of network probes, with each network probe operable to supply raw communications data for calls made within the coverage area of one of the radio network controllers associated with the data processing unit.

12. A modular data processing system in accordance with claim 11, wherein:
- each network probe is connected between the controller and another element of the mobile radio communications network, whereby the network probe captures communication session data flowing between the controller and the other element.

13. A modular data processing system in accordance with claim 1, wherein:
- each data processing unit is operable to provide processed data comprising geolocation and/or quality of service data for all calls occurring in the coverage area of the set of radio network controllers associated with the data processing unit.

14. A modular data processing system in accordance with claim 1, wherein:
each data processing unit is operable to provide processed data for the production of one or more of a coverage map, raw statistics, or network-wide statistics.

15. A method for processing data from a cellular mobile communications system, the method comprising:
providing a plurality of controllers grouped into a plurality of sets with each one of the plurality of sets having at least two controllers;
providing a plurality of autonomous data processing units such that each data processing unit comprises both a data loader and main storage device;
supplying raw communication session data from a data collection subsystem to the plurality of autonomous data processing units, the raw communication session data supplied to each of the at least two autonomous data processing units relating to calls made within a coverage area of one set of controllers associated with a respective autonomous data processing unit;
operating the plurality of autonomous data processing units in parallel and simultaneously, each data processing unit receiving and processing the raw communication session data from an associated set of the plurality of controllers of the cellular mobile communications system.

16. A method in accordance with claim 15, further comprising each of the plurality of data processing units:
(i) processing the raw communication session data, for calls made within the coverage area of the associated set of controllers, independently of the other data processing units; and
(ii) supplying processed data to a main storage device; and
(iii) making the processed data in the main storage device accessible to external users.

17. A method in accordance with claim 15, further comprising:
(i) keeping the set of controllers of the cellular mobile communications system associated with at least one of the data processing units constant, for a first predetermined time interval; and
(ii) adding a controller of the cellular mobile communications system to the set of controllers, or removing a controller, after the first predetermined time interval.

18. A method in accordance with claim 15, further comprising:
synchronizing the downloaded of data from the plurality of data processing units to the common memory; wherein
a dataloader comprises a synchronizing module and the data processor, and the dataloader downloads processed data for calls made during a second predetermined time interval, to the main storage device, only when processed data for the second predetermined time interval is available from all of the plurality of data processing units;
the second predetermined time interval covers the time period from a first time point to a second time point, the processed data relating to substantially all calls made in the cellular mobile communications system between the first and second time points.

19. A method in accordance with claim 15, further comprising:
adding a further autonomous data processing unit in parallel to the plurality of autonomous data processing units, the further autonomous data processing unit having an associated set of controllers of the cellular mobile communications system and being linked to at least one of the main storage device.

20. A method in accordance with claim 15, further comprising:
storing the raw communication session data temporarily, during processing by the data processing unit, in a main storage device.

21. A method in accordance with claim 15, wherein:
the operational support system of the cellular mobile communication system supplies raw communication session data to all the data processing units, the operational support system supplying raw communications data to each data processing unit for calls made within the coverage area of the set of controllers associated with the data processing unit.

22. A method in accordance with claim 15, wherein:
the controllers are radio network controllers of the cellular mobile communication system; and
a network probe captures communication session data flowing between a radio network controller and the operational support system, the network probe being connected between the radio network controller and the operational support system of the cellular mobile communication system.

23. A method in accordance with claim 15, wherein each data processing unit provides:
(i) processed data comprising geolocation and/or quality of service data for all calls occurring in the coverage area of the set of controllers associated with the data processing unit; and/or
(ii) processed data for the production of one or more of a coverage map, raw statistics, or network-wide statistics.

24. A computer-readable storage device having executable program code stored therein and executed on at least one processor for programming signal processing logic to perform a method of:
receiving raw communication data from a plurality of controllers grouped into a plurality of sets with each one of the plurality of sets having at least two controllers;
supplying the received raw communication session data to a plurality of autonomous data processing units through a data collection subsystem, the raw communication session data supplied to each of the plurality of autonomous data processing units relating to calls made within a coverage area of one set of controllers associated with a respective data processing unit;
operating the plurality of autonomous data processing units in parallel and simultaneously, each data processing unit receiving and processing the raw communication session data from the associated set of controllers of the cellular mobile communications system; and
storing the processed communication session data from the plurality of data processing units within a common memory device for subsequent access by at least one user.

25. The computer-readable storage device of claim 24, wherein the tangible computer program product comprises at least one of: a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

* * * * *